United States Patent
Kubota

(10) Patent No.: US 11,590,893 B2
(45) Date of Patent: *Feb. 28, 2023

(54) VEHICLE ELECTRONIC MIRROR SYSTEM

(71) Applicant: TOYOTA JIDOSHA KABUSHIKI KAISHA, Toyota (JP)

(72) Inventor: Yosuke Kubota, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/444,232

(22) Filed: Aug. 2, 2021

(65) Prior Publication Data

US 2021/0362651 A1 Nov. 25, 2021

Related U.S. Application Data

(63) Continuation of application No. 16/579,957, filed on Sep. 24, 2019, now Pat. No. 11,110,862.

(30) Foreign Application Priority Data

Nov. 15, 2018 (JP) .............................. JP2018-214773

(51) Int. Cl.
H04N 5/262 (2006.01)
B60R 1/00 (2022.01)
H04N 5/225 (2006.01)

(52) U.S. Cl.
CPC ........... *B60R 1/002* (2013.01); *H04N 5/2254* (2013.01); *H04N 5/2628* (2013.01);
(Continued)

(58) Field of Classification Search
None
See application file for complete search history.

(56) References Cited

U.S. PATENT DOCUMENTS 11,110,862 B2 * 9/2021 Kubota ................ H04N 5/2628
2009/0079585 A1 3/2009 Chinomi et al.
(Continued)

FOREIGN PATENT DOCUMENTS

JP 2009081664 A 4/2009
JP 2010095086 A 4/2010
(Continued)

OTHER PUBLICATIONS

Non-Final Office Action, United States Patent and Trademark Office, issued to U.S. Appl. No. 16/579,957 dated Jun. 25, 2020, 6 pages.
(Continued)

*Primary Examiner* — Christopher G Findley
(74) *Attorney, Agent, or Firm* — Hunton Andrews Kurth LLP

(57) ABSTRACT

A rearward camera of a vehicle electronic mirror system images a rearward view of a vehicle, and a lateral rearward camera unit images each of right and left lateral rearward views of the vehicle. A control device compresses at least one of a rearward view picture after imaging by the rearward camera and right and left lateral rearward view pictures after imaging by the lateral rearward camera unit, at least in a vehicle-width direction, and performs display on an inner mirror display. The control device changes the compression ratio of the picture in the control device, depending on at least one of a state and peripheral situation of the vehicle. Accordingly, when a vehicle rearward side including lateral rearward sides contains a site requiring an easy distance-sense grasp, it is possible to easily grasp distance sense by decreasing the compression ratio of the picture corresponding to the site.

3 Claims, 10 Drawing Sheets

(52) U.S. Cl.
CPC ............... *B60R 2300/101* (2013.01); *B60R 2300/105* (2013.01); *B60R 2300/303* (2013.01); *B60R 2300/305* (2013.01); *B60R 2300/70* (2013.01); *B60R 2300/802* (2013.01); *B60R 2300/8046* (2013.01); *B60R 2300/8066* (2013.01)

(56) References Cited

U.S. PATENT DOCUMENTS

| | | |
|---|---|---|
| 2016/0059781 A1 | 3/2016 | Tatara |
| 2017/0129405 A1 | 5/2017 | Oba |
| 2019/0199940 A1 | 6/2019 | Shidochi et al. |
| 2019/0248288 A1 | 8/2019 | Oba |
| 2020/0156541 A1 | 5/2020 | Kubota |

FOREIGN PATENT DOCUMENTS

| | | |
|---|---|---|
| JP | 2016048839 A | 4/2016 |
| JP | 2017521322 A | 8/2017 |
| JP | 2019118016 A | 7/2019 |
| WO | 2015193851 A1 | 12/2015 |
| WO | 2018012299 A1 | 1/2018 |

OTHER PUBLICATIONS

Final Office Action, United States Patent and Trademark Office, issued to U.S. Appl. No. 16/579,957 dated Dec. 24, 2020, 7 pages.

Advisory Action, United States Patent and Trademark Office, issued to U.S. Appl. No. 16/579,957 dated Apr. 15, 2021, 3 pages.

Notice Of Allowance, United States Patent and Trademark Office, issued to U.S. Appl. No. 16/579,957 dated May 14, 2021, 7 pages.

* cited by examiner

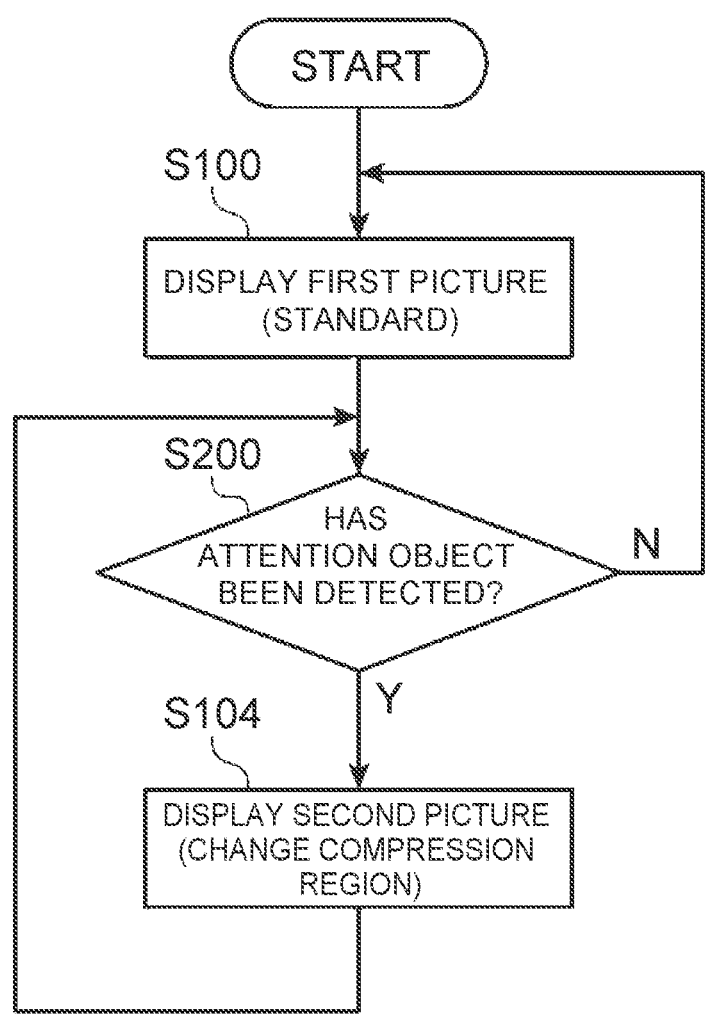

VEHICLE ELECTRONIC MIRROR SYSTEM

INCORPORATION BY REFERENCE

This is a continuation application of U.S. patent application Ser. No. 16/579,957, filed Sep. 24, 2019, which claims the disclosure of Japanese Patent Application No. 2018-214773 filed on Nov. 15, 2018 including the specification, drawings and abstract incorporated herein by reference in their entirety.

BACKGROUND

1. Technical Field

The present disclosure relates to a vehicle electronic mirror system.

2. Description of Related Art

Japanese Patent Application Publication No. 2009-81664 (JP 2009-81664 A) discloses a vehicle surrounding monitoring device. The vehicle surrounding monitoring device synthesizes a rearward view picture of a vehicle rearward side of a vehicle that is taken by an in-vehicle camera provided at a center in a vehicle-width direction and lateral rearward view pictures of right and left rearward sides of the vehicle that are respectively taken by in-vehicle cameras provided at positions corresponding to right and left side mirrors, and displays the synthesized picture on a display device. The vehicle surrounding monitoring device displays the right and left lateral rearward view pictures, such that the right and left lateral rearward view pictures are compressed compared to the rearward view picture. Thereby, it is possible to visually recognize a wide range including the lateral rearward sides, while easily grasping distance sense in the vehicle rearward side that requires attention.

SUMMARY

However, in the case of the configuration disclosed in JP 2009-81664 A, the lateral rearward view pictures are compressed and displayed, and therefore, when the vehicle moves to one side in the vehicle-width direction, there is a possibility that it is difficult to grasp a rearward situation of the side to which the vehicle moves, from display means. In this regard, the above related art has room for improvement.

In consideration of the above circumstance, the present disclosure has object to obtain a vehicle electronic mirror system that allows an occupant to appropriately grasp a situation of a periphery of the vehicle.

A vehicle electronic mirror system according to the present disclosure described in claim 1 includes: rearward view imaging means for imaging a rearward view of a vehicle; lateral rearward view imaging means for imaging each of rearward views of right and left lateral sides of the vehicle; compression process control means for compressing at least one of a rearward view picture resulting from the imaging by the rearward view imaging means and right and left lateral rearward view pictures resulting from the imaging by the lateral rearward view imaging means, at least in a vehicle-width direction, and displaying the compressed picture on display means; and compression ratio change control means for changing the compression ratio of the picture in the compression process control means, from a compression ratio at a normal time, depending on at least one of a state of the vehicle and a situation of a periphery of the vehicle.

With the present disclosure described in claim 1, the vehicle electronic mirror system includes the rearward view imaging means, the lateral rearward view imaging means, the compression process control means, and the compression ratio change control means. The rearward view imaging means images the rearward view of the vehicle, and the lateral rearward view imaging means images each of the rearward views of the right and left lateral sides of the vehicle. The compression process control means compresses at least one of the rearward view picture resulting from the imaging by the rearward view imaging means and the right and left lateral rearward view pictures resulting from the imaging by the lateral rearward view imaging means, at least in the vehicle-width direction, and displays the compressed picture on the display means. Accordingly, by visually recognizing the display means, an occupant can visually recognize a wide range of a vehicle rearward side. Here, the compression ratio change control means changes the compression ratio of the picture in the compression process control means, from the compression ratio at the normal time, depending on at least one of the state of the vehicle and the situation of the periphery of the vehicle. Accordingly, in the case where the vehicle rearward side including lateral rearward sides contains a site that requires an easy grasp of distance sense, it is possible to easily grasp the distance sense by decreasing the compression ratio of the picture corresponding to the site.

With the present disclosure described in claim 1, when the physical body is detected in the periphery of the vehicle, the compression ratio change control means changes the compression ratio of the lateral rearward view picture of the one side in the vehicle-width direction that corresponds to the direction of the detection of the physical body, to a smaller compression ratio than the compression ratio before the detection of the physical body, or to the non-compression. Further, the compression ratio change control means changes the compression ratio of the lateral rearward view picture of the side corresponding to the other side in the vehicle-width direction, to a larger compression ratio than the compression ratio before the detection of the physical body. Accordingly, it is possible to grasp the situation in a wide range of the vehicle rearward side, and it is possible to easily grasp the distance sense in the lateral rearward view of the one side in the vehicle-width direction that corresponds to the direction of the detection of the physical body. That is, the occupant can easily grasp the distance sense for the physical body.

In a vehicle electronic mirror system according to the present disclosure described in claim 2, when the compression ratio change control means changes the compression ratio of the picture to be displayed on the display means, the compression ratio change control means may continuously change the compression ratio.

With the present disclosure described in claim 2, when the compression ratio change control means changes the compression ratio of the picture to be displayed on the display means, the compression ratio change control means continuously changes the compression ratio. Accordingly, the occupant can follow the change in the picture, and therefore, it is possible to restrain confusion caused by switching of the picture, compared to a case where the picture suddenly switches.

Here, the term "continuously" includes a case of a continuous change until the middle of the process, a case of a continuous change from the middle of the process, and a case of a stepwise process.

In a vehicle electronic mirror system according to the present disclosure described in claim 3, the compression process control means may display a boundary mark on a boundary between the rearward view picture and the lateral rearward view picture that are displayed on the display means.

With the present disclosure described in claim 3, the compression process control means displays the boundary mark on the boundary between the rearward view picture and the lateral rearward view picture that are displayed on the display means, and therefore, even when the compression ratio of each picture is changed, the occupant can recognize the boundary between the rearward view picture and the lateral rearward view picture. Accordingly, even when display ranges on the display means are greatly changed, the occupant can easily grasp what picture is displayed on the display means.

The vehicle electronic mirror system according to the present disclosure described in claim 1 has a beneficial effect by which the occupant can appropriately grasp the situation of the periphery of the vehicle.

The vehicle electronic mirror system according to the present disclosure described in claim 2 has a beneficial effect by which it is possible to reduce a feeling of strangeness of the occupant.

The vehicle electronic mirror system according to the present disclosure described in claim 3 has a beneficial effect by which the occupant can further appropriately grasp the situation of the periphery of the vehicle even in the case of a display change.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 10 is a flowchart showing a behavior flow of the vehicle electronic mirror system according to the second embodiment.

DETAILED DESCRIPTION OF EMBODIMENTS

First Embodiment

Figure 1:
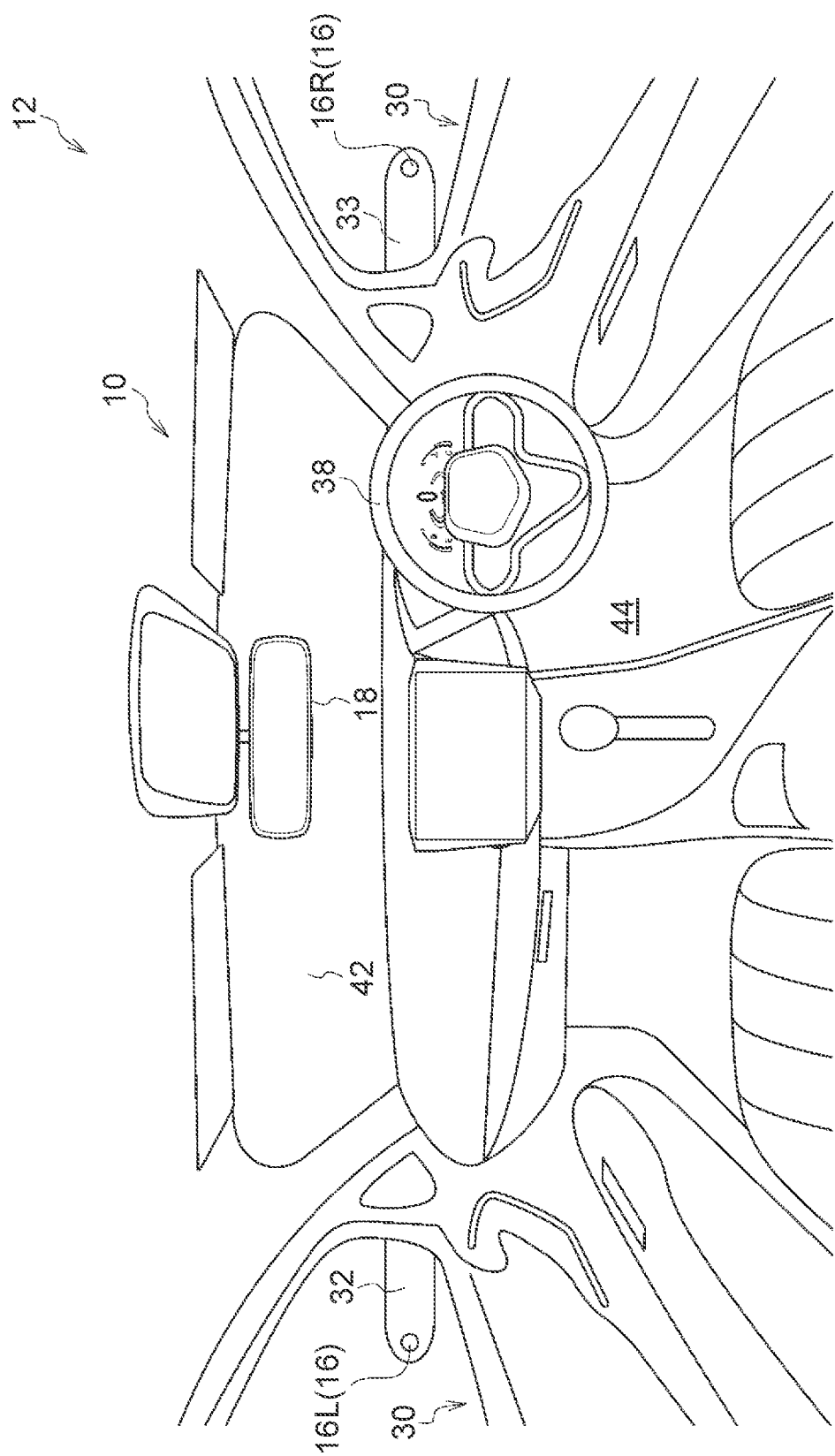
FIG. 1 is a schematic perspective view showing a vehicle cabin of a vehicle including a vehicle electronic mirror system according to a first embodiment, as viewed toward a vehicle front side.

Hereinafter, a first embodiment of a vehicle electronic mirror system according to the present disclosure will be described with use of FIG. 1 to FIG. 7. In the drawings, identical or equivalent constituent elements and parts are denoted by identical reference characters. Further, proportions of dimensions in the drawings are exaggerated for convenience of description, and are sometimes different from actual proportions.

Hardware Constituents

Figure 3:
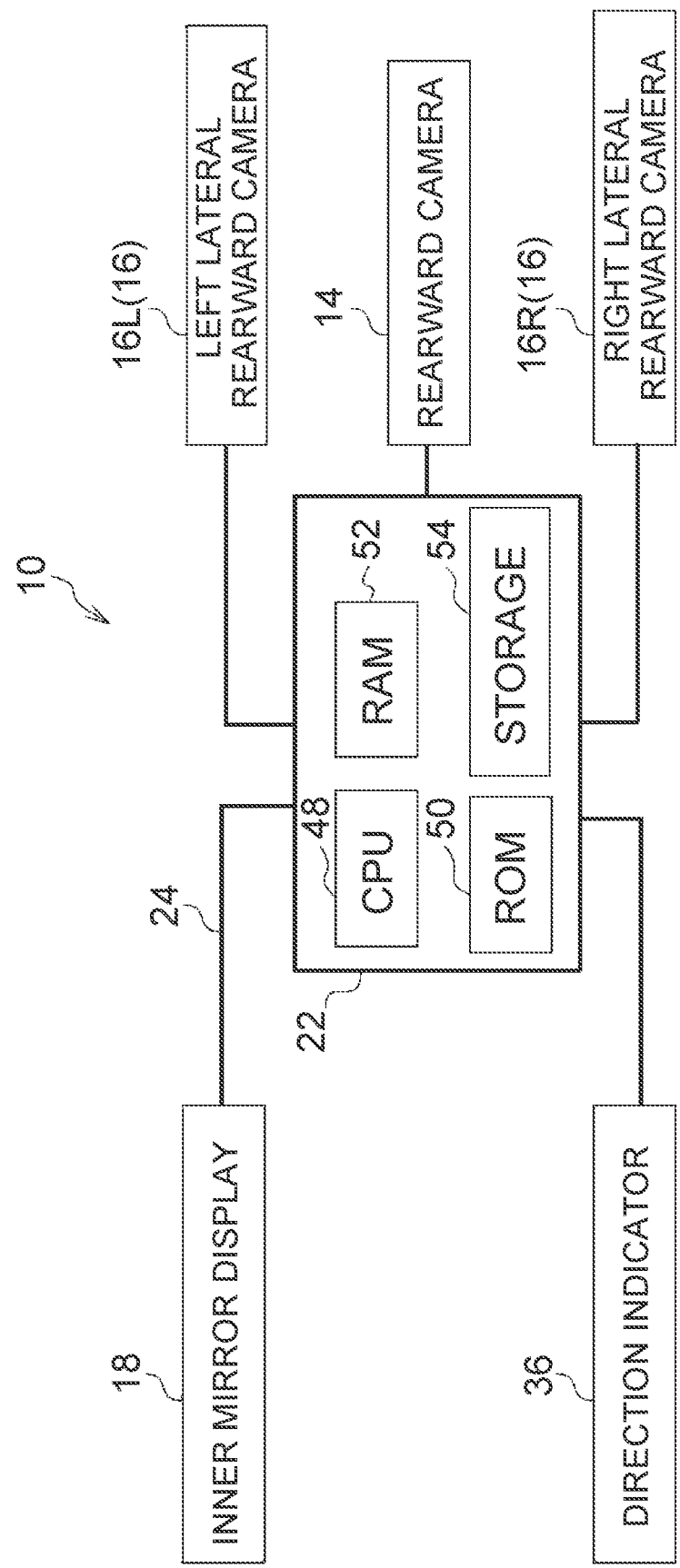
FIG. 3 is a block diagram showing hardware constituents of the vehicle electronic mirror system according to the first embodiment.

FIG. 3 is a block diagram showing hardware constituents of a vehicle electronic mirror system 10. As shown in FIG. 3, the vehicle electronic mirror system 10 includes a rearward camera 14 as rearward view imaging means that is mounted on a vehicle 12 (see FIG. 1), a lateral rearward camera unit 16 as lateral rearward view imaging means, an inner mirror display 18 as display means, and a control device 22 as compression process control means and compression ratio change control means, and a direction indicator 36. The constituents are connected by a bus 24, such that the constituents can communicate with each other.

Figure 2:
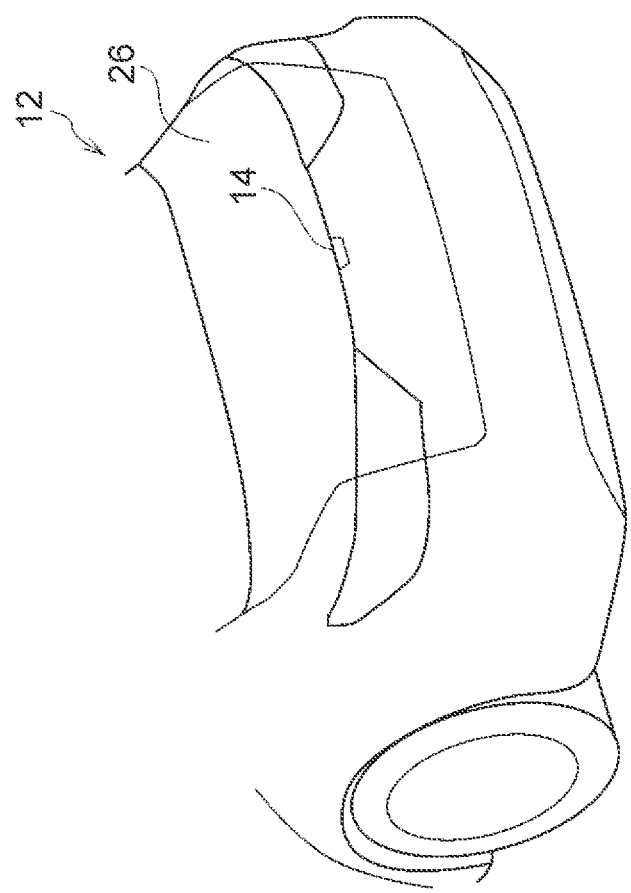
FIG. 2 is a schematic perspective view showing a rear portion of the vehicle including the vehicle electronic mirror system according to the first embodiment.

As shown in FIG. 2, the rearward camera 14 is disposed at a rear portion of a trunk lid 26 of the vehicle 12, such that an imaging optical axis (lens) is oriented in a rearward direction of the vehicle, and images a rearward view of the vehicle 12. The position where the rearward camera 14 is disposed only needs to be a position that allows the imaging of the rearward view of the vehicle 12. The rearward camera 14 may be disposed near a rear bumper of the vehicle 12, or may be disposed so as to image the rearward view of the vehicle 12 through a rear windshield glass. The rearward camera 14 has a fixed-focus lens, has no mechanism that changes the orientation of the imaging optical axis, and images a constant imaging range.

As shown in FIG. 1, a base portion of a camera support 32 having a nearly rectangular shape with an arc-like distal end portion is attached to a vehicle lateral front end portion of an intermediate portion in a vehicle-height direction of a vehicle door 30 (left front side door) of the vehicle 12, such that the distal end portion of the camera support 32 projects in a vehicle outward direction. Near the distal end portion of the camera support 32, a left lateral rearward camera 16L, which constitutes a part of the lateral rearward camera unit 16, is attached, such that an imaging optical axis (lens) of the left lateral rearward camera 16L is oriented in a left rearward direction of the vehicle. The left lateral rearward camera 16L images a part of the left rearward side and left side of the vehicle. The camera support 32 can pivot in a vehicle front-rear direction such that the axial direction is nearly the vehicle-height direction, and can pivot to a storage position where a longitudinal direction of the camera support 32 is along an outside surface of the vehicle, or to a return position where the left lateral rearward camera 16L images a left lateral rearward view of the vehicle, by driving power of an unillustrated actuator.

The left lateral rearward camera 16L, as an example, has no mechanism that changes the orientation of the imaging optical axis, and has a fixed-focus lens with a relatively wide angular field. Therefore, in a state where the camera support 32 is at the return position, the left lateral rearward camera 16L images a relatively wide and constant imaging range of a left lateral rearward side of the vehicle.

Further, a base portion of a camera support 33 having a symmetrical shape to the camera support 32 is attached to a vehicle lateral front end portion of an intermediate portion in the vehicle-height direction of a vehicle door 30 (right front side door) of the vehicle 12. Near the distal end portion of the camera support 33, a right lateral rearward camera 16R, which constitutes another part of the lateral rearward camera unit 16, is attached, such that an imaging optical axis (lens) of the right lateral rearward camera 16R is oriented in a right rearward direction of the vehicle. The right lateral rearward camera 16R images a part of the right rearward side and the right side of the vehicle. The camera support 33 can pivot in the vehicle front-rear direction such that the axial direction is the vehicle-height direction, and can pivot to a storage position where a longitudinal direction of the camera support 33 is along an outside surface of the vehicle, or a return position where the right lateral rearward camera 16R images a right lateral rearward view of the vehicle, by driving power of an unillustrated actuator.

Similarly to the left lateral rearward camera 16L, as an example, the right lateral rearward camera 16R has no mechanism that changes the orientation of the imaging optical axis, and has a fixed-focus lens with a relatively wide angular field. Therefore, in a state where the camera support 33 is at the return position, the right lateral rearward camera 16R images a relatively wide and constant imaging range of a right lateral rearward side of the vehicle.

The inner mirror display 18 is provided on a vehicle upper side of a front windshield glass 42, at nearly the center in the vehicle-width direction. As an example, the inner mirror display 18 is constituted by a liquid crystal panel, and can display a picture toward the inside of a vehicle cabin 44. The inner mirror display 18 displays pictures resulting from the imaging by the rearward camera 14, the left lateral rearward camera 16L and the right lateral rearward camera 16R, after synthesis and picture processing by the control device 22. That is, the inner mirror display 18 functions as a replacement for an inner mirror, and the occupant visually recognizes the picture displayed on the inner mirror display 18, and thereby, can check the situation of the periphery of the vehicle 12 centered on the rearward side of the vehicle.

As shown in FIG. 3, the control device 22 is configured to include a central processing unit (CPU) 48, a read only memory (ROM) 50, a random access memory (RAM) 52, and a storage 54, which are provided in the interior.

The CPU 48, which is a central arithmetic processing unit, executes a variety of programs and controls respective parts. That is, the CPU 48 reads programs from the ROM 50 or the storage 54, and executes the programs while using the RAM 52 as a working region. In accordance with the programs recorded in the ROM 50 or the storage 54, the CPU 48 performs controls of the above constituents and a variety of arithmetic processes. In the embodiment, a surrounding display program is stored in the ROM 50 or the storage 54.

In the ROM 50, a variety of programs and a variety of data are stored. In the RAM 52, as a working region, programs or data are temporarily stored. The storage 54 is constituted by a hard disk drive (HDD) or a solid state drive (SDD), and a variety of programs including an operating system and a variety of data are stored.

The direction indicator 36 is a so-called winker for showing a direction of the vehicle-width direction in which the occupant moves at the time of a large steering angle driving or a small steering angle driving of the vehicle 12, to the exterior of the vehicle 12, through blinking of an unillustrated winker lamp. The direction indicator 36 is provided near a steering wheel 38 (see FIG. 1).

Functional Constituents

At the time of the execution of the above surrounding display program, the vehicle electronic mirror system 10 realizes a variety of functions, using the above hardware resources. Functional constituents to be realized by the vehicle electronic mirror system 10 will be described.

Figure 4:
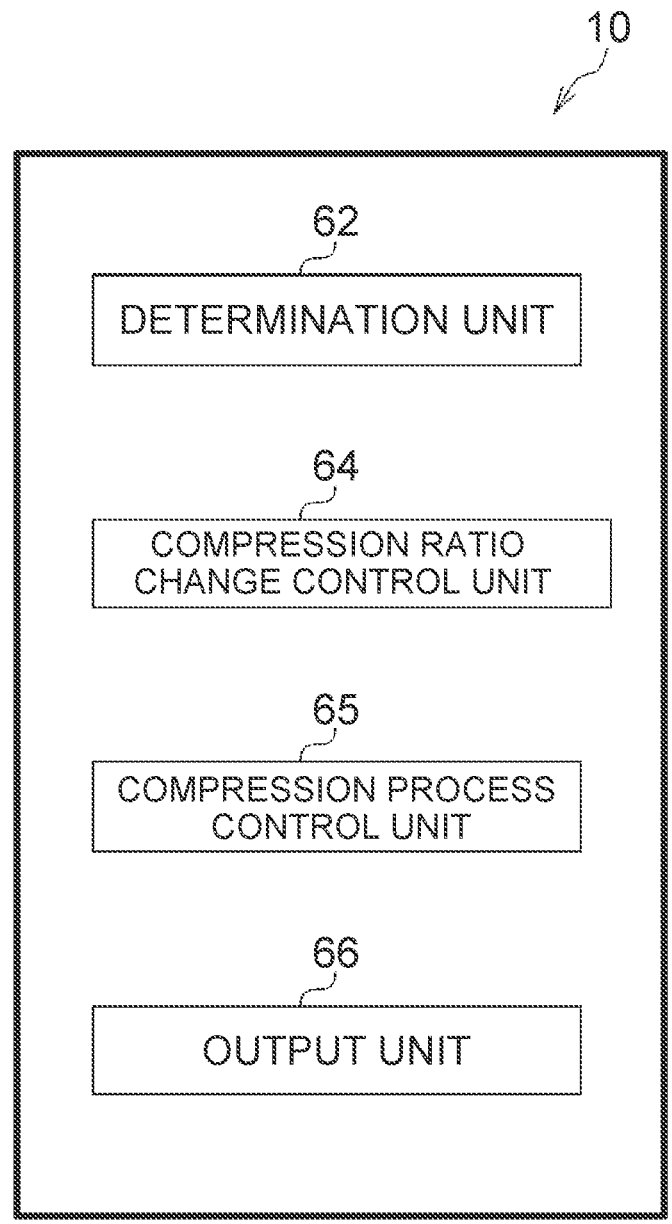
FIG. 4 is a block diagram showing functional constituents of the vehicle electronic mirror system according to the first embodiment.

FIG. 4 is a block diagram showing exemplary functional constituents of the vehicle electronic mirror system 10.

As shown in FIG. 4, the vehicle electronic mirror system 10 includes a determination unit 62, a compression ratio change control unit 64, a compression process control unit 65, and an output unit 66, as functional constituents. The functional constituents are realized when the CPU 48 of the control device 22 reads the surrounding display program stored in the ROM 50 or the storage 54 (see FIG. 3) and executes the surrounding display program.

The determination unit 62 determines whether the direction indicator 36 is operating. In the case where the direction indicator 36 is operating, the determination unit 62 determines an operating direction (the rightward direction or leftward direction of the vehicle-width direction) of the direction indicator 36. Then, in the case where the direction indicator 36 is operating for the leftward side in the vehicle-width direction, the determination unit 62 determines that the vehicle 12 moves to the leftward side. On the other hand, in the case where the direction indicator 36 is operating for the rightward side in the vehicle-width direction, the determination unit 62 determines that the vehicle 12 moves to the rightward side.

Figure 5:
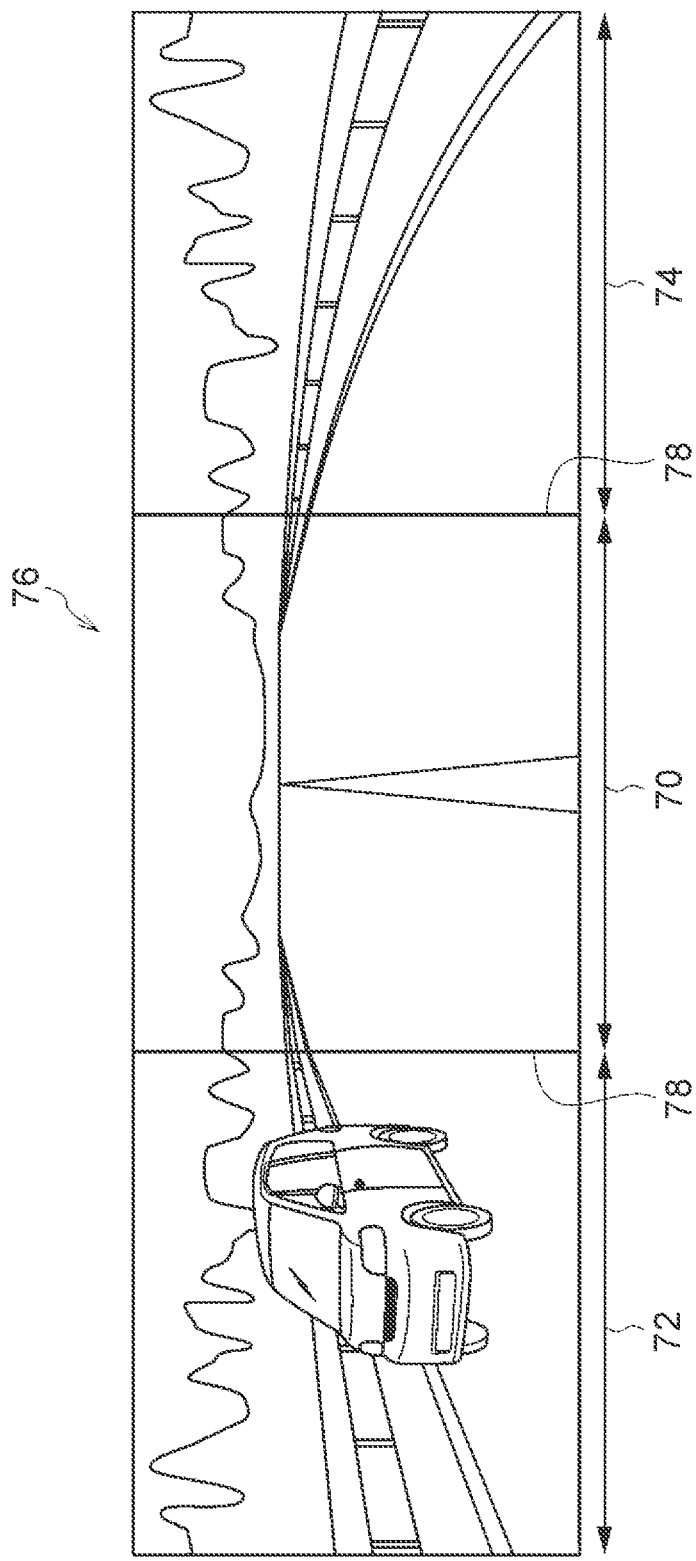
FIG. 5 is a schematic view showing a display state of the display means at a normal time of the vehicle including the vehicle electronic mirror system according to the first embodiment.

The compression process control unit 65 performs synthesis such that a rearward view picture 70 resulting from the imaging by the rearward camera 14 and lateral rearward view pictures 72, 74 resulting from the imaging by the left lateral rearward camera 16L and the right lateral rearward camera 16R respectively are continuously displayed on the inner mirror display 18, as shown in FIG. 5. That is, the compression process control unit 65 synthesizes a picture extracted from the left lateral rearward view picture 72, on the left side of the rearward view picture 70, and synthesizes a picture extracted from the right lateral rearward view picture 74, on the right side of the rearward view picture 70, and thereby, the compression process control unit 65 generates a picture in which a region of the rearward view picture 70, a region of the lateral rearward view picture 72 and a region of the lateral rearward view picture 74 smoothly continues. The generated picture is a picture similar to a view when the occupant of the vehicle 12 visually observes the rearward side and lateral rearward sides of the vehicle 12. As shown in FIG. 5, at a normal time, the compression process control unit 65 displays the rearward view picture 70 at a center portion in the vehicle-width direction of the inner mirror display 18, with no compression, and displays the lateral rearward view pictures 72, 74 so as to be adjacent to the center portion in the vehicle-width direction of the inner mirror display 18, while the lateral rearward view pictures 72, 74 are compressed in the vehicle-width direction (hereinafter, the display in this state is referred to as a "first picture 76"). The compression process control unit 65 displays boundary marks 78 on boundaries among the rearward view picture 70 and the lateral rearward view pictures 72, 74 that are displayed on the inner mirror display 18.

Figure 6:
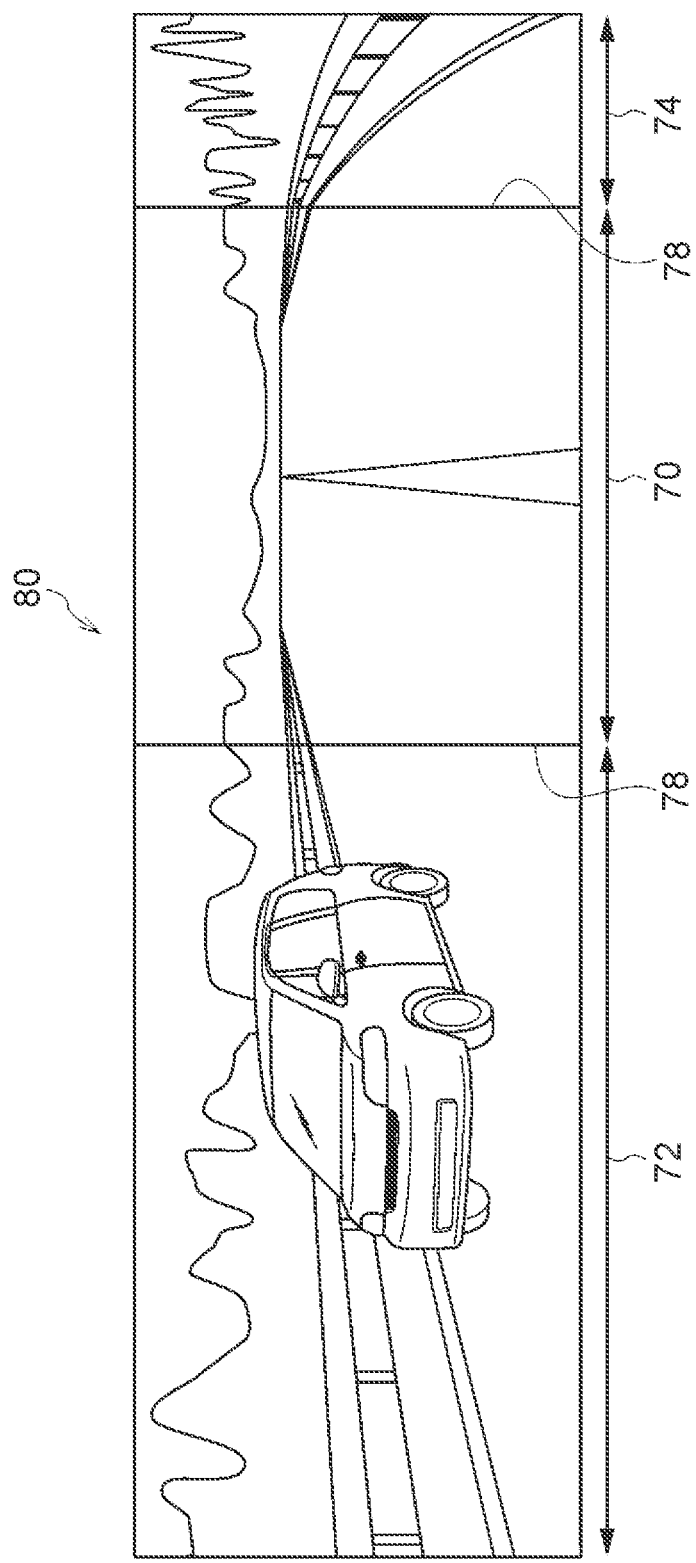
FIG. 6 is a schematic view showing a display state of the display means when the vehicle including the vehicle electronic mirror system according to the first embodiment moves to one side in a vehicle-width direction.

When the compression ratio change control unit 64 receives, from the determination unit 62, information indicating that the vehicle 12 moves in the rightward or leftward direction based on operating information about the direction indicator 36, the compression ratio change control unit 64 changes the compression ratios of the lateral rearward view pictures 72, 74 in the compression process control unit 65, from compression ratios before the receiving of the information indicating that the vehicle 12 moves in the rightward or leftward direction, that is, from compression ratios of the first picture 76. Specifically, in the case where it is determined that the vehicle 12 moves to the leftward side in the vehicle-width direction, the compression ratio change control unit 64 changes the compression ratio in the compression process control unit 65 for the lateral rearward view picture 72 resulting from the imaging by the left lateral rearward camera 16L, to a smaller compression ratio than the compression ratio at the normal time (the first picture 76), or to a non-compression. In contrast, the compression ratio change control unit 64 changes the compression ratio in the compression process control unit 65 for the lateral rearward view picture 74 resulting from the imaging by the right lateral rearward camera 16R, to a larger compression ratio than the compression ratio at the normal time (the first picture 76). Accordingly, as shown in FIG. 6, without changing the compression ratio of the rearward view picture 70, it is possible to decrease the display range of the lateral rearward view picture 74, and by a quantity equivalent to the decrease quantity, increase the display range of the lateral rearward view picture 72 (hereinafter, the display in this state is referred to as a "second picture 80"). The boundary marks 78 to be displayed on the inner mirror display 18 are also displaced in the vehicle-width direction, with the change in the compression ratios.

In the case where it is determined that the vehicle 12 moves to the rightward side in the vehicle-width direction, the second picture 80 is displayed on the inner mirror display 18, similarly. That is, the compression ratio change control unit 64 changes the compression ratio in the compression process control unit 65 for the lateral rearward view picture 74 resulting from the imaging by the right lateral rearward camera 16R, to a smaller compression ratio than the compression ratio at the normal time (the first picture 76), or to the non-compression. In contrast, the compression ratio change control unit 64 changes the compression ratio in the compression process control unit 65 for the lateral rearward view picture 72 resulting from the imaging by the left lateral rearward camera 16L, to a larger compression ratio than the compression ratio at the normal time (the first picture 76). Accordingly, without changing the compression ratio of the rearward view picture 70, it is possible to decrease the display range of the lateral rearward view picture 72, and by a quantity equivalent to the decrease quantity, increase the display range of the lateral rearward view picture 74.

The output unit 66 outputs the picture from the compression process control unit 65, to the inner mirror display 18. In the case of the change in the compression rations of the rearward view picture 70 and the lateral rearward view pictures 72, 74 that are displayed on the inner mirror display 18, the output unit 66 outputs the picture to the inner mirror display 18, such that the compression ratios continuously changes.

Processing Flow

Figure 7:
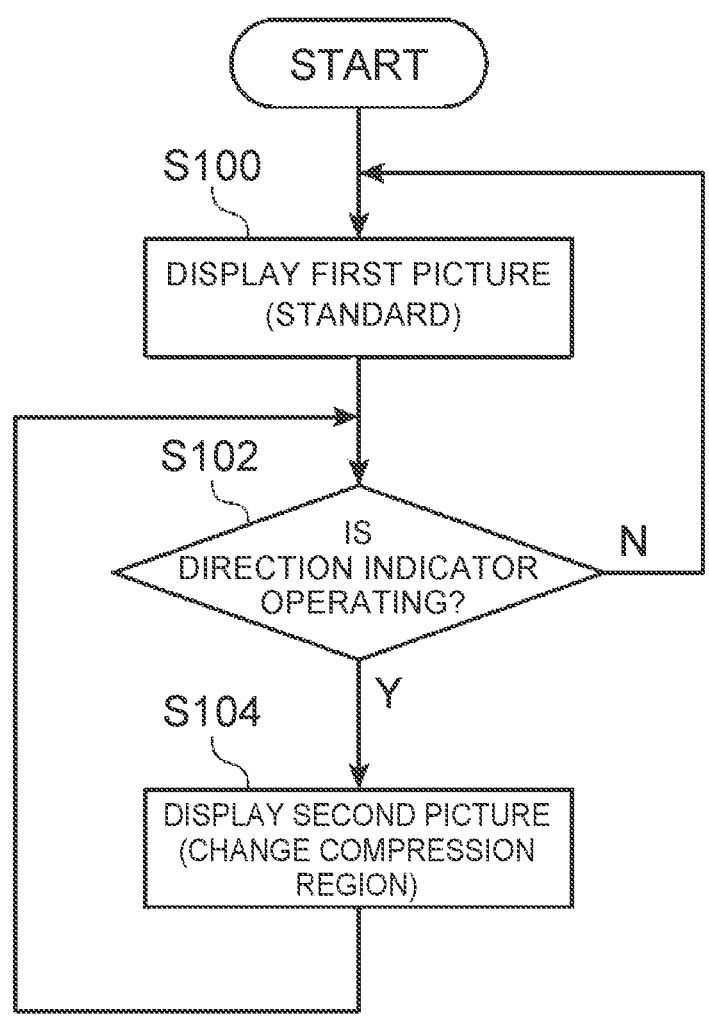
FIG. 7 is a flowchart showing a behavior flow of the vehicle electronic mirror system according to the first embodiment.

Next, an action of the vehicle electronic mirror system 10 will be described. FIG. 7 is a flowchart showing a behavior flow of the vehicle electronic mirror system 10. The CPU 48 reads the surrounding display program from the ROM 50 or the storage 54, expands the surrounding display program in the RAM 52, and executes the surrounding display program, so that the picture display is performed.

The CPU 48 displays the first picture 76 on the inner mirror display 18 (step S100). Then, the CPU 48 determines whether the direction indicator 36 is operating (step S102). In the case where the direction indicator 36 is not operating (step S102: NO), the CPU 48 repeats the process from step S100.

In the case where the direction indicator 36 is operating (step S102: YES), that is, in the case where the vehicle 12 moves to one side in the vehicle-width direction, the CPU 48 displays, on the inner mirror display 18, the second picture 80 resulting from changing the compression ratio of one of the lateral rearward view pictures 72, 74 that corresponds to the operating direction of the direction indicator 36 to a smaller compression ratio or the non-compression (step S104), and thereafter, repeats the process from the step S102. Then, in the case where a system end process for a power unit system of the vehicle 12 is performed, the CPU 48 ends the process based on the surrounding display program.

Operation and Effect of First Embodiment

Next, an operation and an effect of the first embodiment will be described.

In the embodiment, as shown in FIG. 3, the vehicle electronic mirror system 10 includes the rearward camera 14, the lateral rearward camera unit 16, and the control device 22. The rearward camera 14 images the rearward view of the vehicle 12, and the lateral rearward camera unit 16 images each of the rearward views of the right and left lateral sides of the vehicle 12. The control device 22 compresses at least one of the rearward view picture 70 resulting from the imaging by the rearward camera 14 and the right and left lateral rearward view pictures 72, 74 resulting from the imaging by the lateral rearward camera unit 16, at least in the vehicle-width direction, and displays the compressed picture on the inner mirror display 18. Accordingly, by visually recognizing the inner mirror display 18, the occupant can visually recognize a wide range of a vehicle rearward side. Here, the control device 22 changes the compression ratio of the picture in the control device 22, from the compression ratio at the normal time (the first picture 76), depending on at least one of the state of the vehicle 12 and the situation of the periphery of the vehicle 12. Accordingly, in the case where the vehicle rearward side including the lateral rearward sides contains a site that requires an easy grasp of distance sense, it is possible to easily grasp the distance sense by decreasing the compression ratio of the picture corresponding to the site. Thereby, the occupant can appropriately grasp the situation of the periphery of the vehicle 12.

When the control device 22 acquires the information indicating that the vehicle 12 moves to one side in the vehicle-width direction, the control device 22 changes the compression ratio of the lateral rearward view picture 72 or lateral rearward view picture 74 of the side corresponding to the one side, to smaller compression ratio than the compression ratio before the acquisition of the information. Further, the control device 22 changes the compression ratio of the lateral rearward view picture 72 or lateral rearward view picture 74 of the side corresponding to the other side in the vehicle-width direction, to a larger compression ratio than the compression ratio before the acquisition of the information. That is, when the control device 22 acquires the information indicating that the vehicle 12 moves to one side in the vehicle-width direction, the control device 22 increases the compression ratio of the lateral rearward view picture 72 or lateral rearward view picture 74 of the side corresponding to the other side in the vehicle-width direction compared to before the acquisition (decreases the display range), and by a quantity equivalent to the increase quantity, decreases the compression ratio of the lateral rearward view picture 72 or lateral rearward view picture 74 of the side corresponding to the one side compared to before the acquisition (increases the display range). Accordingly, it is possible to grasp the situation in a wide range of the vehicle rearward side, and it is possible to easily grasp the distance sense in the lateral rearward view of the one side in the vehicle-width direction to which the vehicle 12 moves.

Furthermore, the control device 22 acquires the information indicating that the vehicle 12 moves to the one side in the vehicle-width direction, from the operating information about the direction indicator 36, and therefore, when the occupant expresses an intention to move the vehicle 12 to the one side in the vehicle-width direction, the compression ratio of the lateral rearward view picture 72 or lateral rearward view picture 74 on the inner mirror display 18 of the side to which the vehicle 12 moves is changed to a smaller compression ratio or the non-compression. Accordingly, by visually recognizing the inner mirror display 18, the occupant can easily grasp the distance sense in the lateral rearward view of the side to which the vehicle 12 moves. Therefore, the occupant can appropriately grasp the situation of the periphery of the vehicle 12, before the occupant moves to the one side in the vehicle-width direction. Further, it is possible to avoid the compression ratio of the picture on the inner mirror display 18 from being changed at a timing that the occupant does not intend. Thereby, when the vehicle 12 moves to the one side in the vehicle-width direction, the occupant can further appropriately grasp the situation of the periphery of the vehicle 12.

Furthermore, when the control device 22 changes the compression ratio of the picture to be displayed on the inner mirror display 18, the control device 22 continuously changes the compression ratio. Accordingly, the occupant can follow the change in the picture, and therefore, it is possible to restrain confusion caused by switching of the picture, compared to a case where the picture suddenly switches. Thereby, it is possible to reduce a feeling of strangeness of the occupant.

Further, the control device 22 displays the boundary marks 78 on the boundaries among the rearward view picture 70 and the lateral rearward view pictures 72, 74 that are displayed on the inner mirror display 18, and therefore, even when the compression ratio of each picture is changed, the occupant can recognize the boundaries among the rearward view picture 70 and the lateral rearward view pictures 72, 74. Accordingly, even when the display ranges on the inner mirror display 18 are greatly changed, the occupant can easily grasp what picture is displayed on the inner mirror display 18. Thereby, even when the display is changed, the occupant can further appropriately grasp the situation of the periphery of the vehicle 12.

In the above-described embodiment, the compression process control unit 65 displays the lateral rearward view pictures 72, 74 on the inner mirror display 18, while the lateral rearward view pictures 72, 74 are compressed in the vehicle-width direction. However, without being limited to this, the compression process control unit 65 may display the lateral rearward view pictures 72, 74 while the lateral rearward view pictures 72, 74 are compressed also in the vehicle-height direction, that is, while the angular field is widened.

Further, the control device 22 acquires the information indicating that the vehicle 12 moves to one side in the vehicle-width direction, from the operating information about the direction indicator 36. However, without being limited to this, as an example, the control device 22 may acquire the information from steering angle detection means (not illustrated) provided near the steering wheel 38. In this case, when the vehicle 12 moves to one side in the vehicle-width direction, it is possible to change the compression ratio of the lateral rearward view picture 72 or lateral rearward view picture 74 on the inner mirror display 18 of the side to which the vehicle 12 moves, to a smaller compression ratio or the non-compression, with no operation other than a steering operation. Accordingly, the occupant can easily grasp the distance sense in the lateral rearward view of the side to which the vehicle moves, with reduction in operation burden of the occupant. Thereby, when the vehicle 12 moves to one side in the vehicle-width direction, the occupant can further appropriately grasp the situation of the periphery of the vehicle 12.

Second Embodiment

Next, a vehicle electronic mirror system according to a second embodiment of the present disclosure will be described with use of FIG. 8 to FIG. 10. Here, constituent parts identical to those in the first embodiment are denoted by identical reference characters, and the descriptions are omitted.

A vehicle electronic mirror system 90 according to the second embodiment, which has the same basic configuration as that in the first embodiment, is characterized in that when a physical body is detected in the periphery of the vehicle 12, the vehicle electronic mirror system 90 changes the compression ratio of the lateral rearward view picture 72 or lateral rearward view picture 74 of one side in the vehicle-width direction that corresponds to the direction of the detection of the physical body, to a smaller compression ratio or the non-compression.

Hardware Constituents

Figure 8:
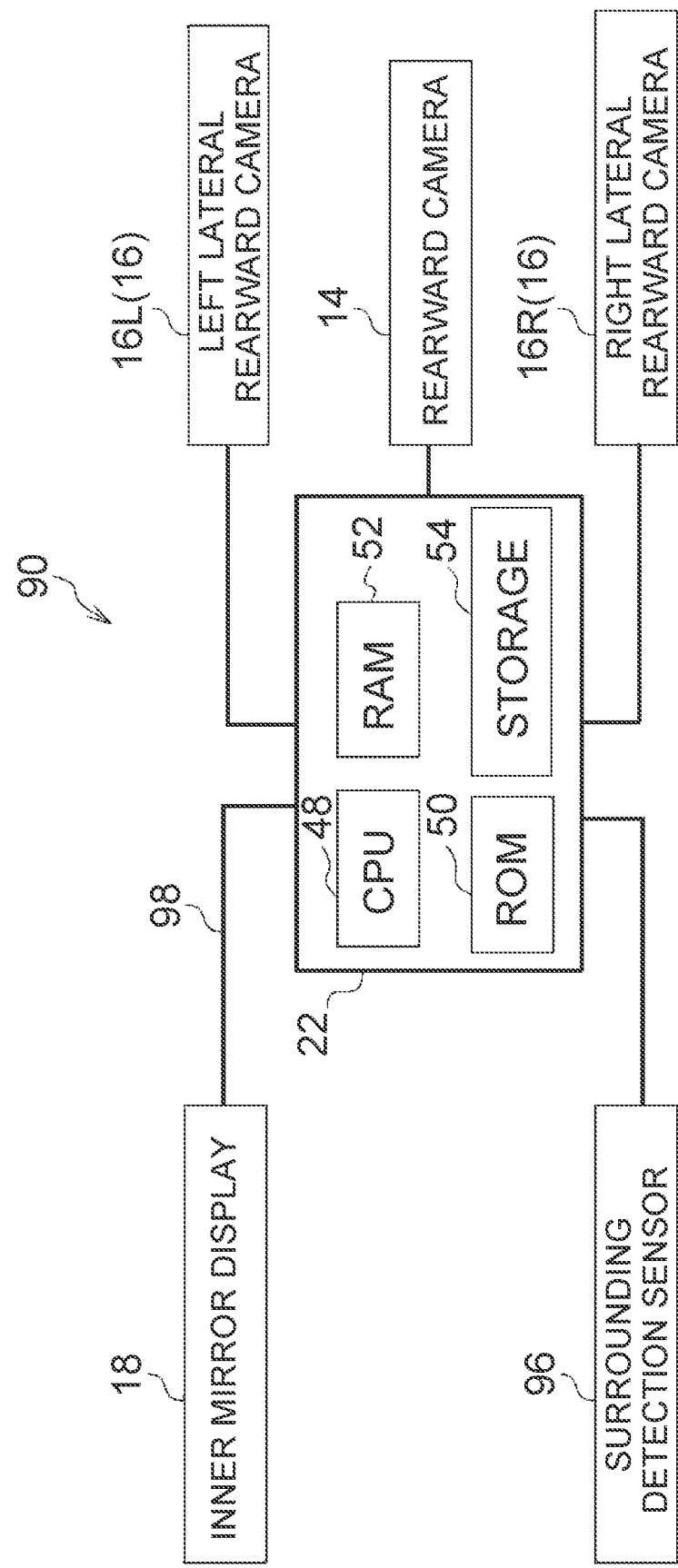
FIG. 8 is a block diagram showing hardware constituents of a vehicle electronic mirror system according to a second embodiment.

That is, as shown in FIG. 8, the vehicle electronic mirror system 90 includes the rearward camera 14, the lateral rearward camera unit 16, the inner mirror display 18, the control device 22 as the compression process control means and the compression ratio change control means, and a surrounding detection sensor 96. The constituents are connected by a bus 98, such that the constituents can communicates with each other.

The surrounding detection sensor 96 is a sensor that detects the situation of the periphery of the vehicle 12, and is configured to include, for example, a laser radar, an ultrasonic sensor or a millimeter-wave radar (the sensors are not illustrated). The surrounding detection sensor 96 may be configured by combination of a plurality of sensors. Alternatively, the surrounding detection sensor 96 may be configured to detect the situation of the periphery of the vehicle 12 by image recognition with a camera.

Functional Constituents

Figure 9:
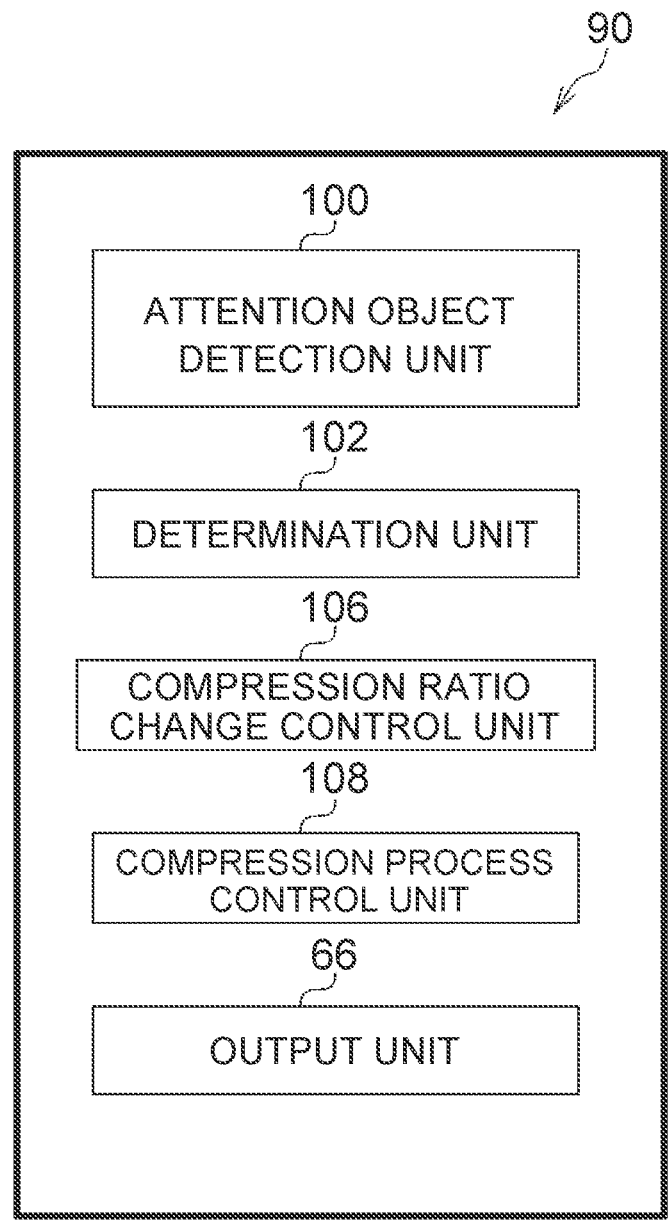
FIG. 9 is a block diagram showing functional constituents of the vehicle electronic mirror system according to the second embodiment.

As shown in FIG. 9, the vehicle electronic mirror system 90 includes an attention object detection unit 100, a determination unit 102, a compression ratio change control unit 106, a compression process control unit 108, and the output unit 66, as functional constituents. The functional constituents are realized when the CPU 48 of the control device 22 reads the surrounding display program stored in the ROM 50 or the storage 54 (see FIG. 3) and executes the surrounding display program.

The attention object detection unit 100 receives information about the situation of the periphery of the vehicle, from the surrounding detection sensor 96, and identifies whether there is a physical body (attention object) such as another vehicle or a pedestrian, the type of the physical body, the position of the physical body, and the like.

The determination unit 102 receives information about the attention object, from the attention object detection unit 100, and selects the lateral rearward view picture 72 or lateral rearward view picture 74 corresponding to the direction of the detection of the attention object, depending on whether the attention object exists and the position of the attention object. Specifically, in the case where the determination unit 102 determines that the attention object exists in the vicinity on the left lateral rearward side of the vehicle 12, the determination unit 102 selects the lateral rearward view picture 72 resulting from the imaging by the left lateral rearward camera 16L, and sends the lateral rearward view picture 72 to the compression process control unit 108. On the other hand, in the case where the determination unit 102 determines that the attention object exists in the vicinity on the right lateral rearward side of the vehicle 12, the determination unit 102 selects the lateral rearward view picture 74 resulting from the imaging by the right lateral rearward camera 16R, and sends the lateral rearward view picture 74 to the compression process control unit 108.

Similarly to the compression process control unit 65 in the first embodiment, the compression process control unit 108 performs synthesis such that the rearward view picture 70 resulting from the imaging by the rearward camera 14 and the lateral rearward view pictures 72, 74 resulting from the imaging by the left lateral rearward camera 16L and the right lateral rearward camera 16R are continuously displayed on the inner mirror display 18. As shown in FIG. 5, at the normal time, the compression process control unit 108 displays the first picture 76 in which the boundary marks 78 are displayed on the respective boundaries among the rearward view picture 70 and the lateral rearward view pictures 72, 74, on the inner mirror display 18.

When the compression ratio change control unit 106 receives, from the determination unit 102, the direction of the detection of the attention object based on the detection information of the surrounding detection sensor 96, the compression ratio change control unit 106 changes the compression ratios of the lateral rearward view pictures 72, 74 in the compression process control unit 108, from the compression ratios before the detection of the attention object, that is, from the compression ratios of the first picture 76. Specifically, in the case where it is determined that the attention object exists in the vicinity on the left lateral rearward side of the vehicle 12, the compression ratio change control unit 106 changes the compression ratio in the compression process control unit 108 for the lateral rearward view picture 72 resulting from the imaging by the left lateral rearward camera 16L, to a smaller compression ratio than the compression ratio at the normal time (the first picture 76), or to the non-compression. In contrast, the compression ratio change control unit 106 changes the compression ratio in the compression process control unit 108 for the lateral rearward view picture 74 resulting from the imaging by the right lateral rearward camera 16R, to a larger compression ratio than the compression ratio at the normal time (the first picture 76). Accordingly, the compression process control unit 108 displays the second picture 80 shown in FIG. 6, on the inner mirror display 18. The boundary marks 78 to be displayed on the inner mirror display 18 are also displaced in the vehicle-width direction, with the change in the compression ratios of the lateral rearward view pictures 72, 74.

In the case where it is determined that the attention object exists in the vicinity on the right lateral rearward side of the vehicle 12, the second picture 80 is displayed on the inner mirror display 18, similarly. That is, the compression ratio change control unit 106 changes the compression ratio in the compression process control unit 108 for the lateral rearward view picture 74 resulting from the imaging by the right lateral rearward camera 16R, to a smaller compression ratio than the compression ratio at the normal time (the first picture 76), or to the non-compression. In contrast, the compression ratio change control unit 106 changes the compression ratio in the compression process control unit 108 for the lateral rearward view picture 72 resulting from the imaging by the left lateral rearward camera 16L, to a larger compression ratio than the compression ratio at the normal time (the first picture 76). Accordingly, without changing the compression ratio of the rearward view picture 70, it is possible to decrease the display range of the lateral rearward view picture 72, and by a quantity equivalent to the decrease quantity, increase the display range of the lateral rearward view picture 74.

Processing Flow

Next, an action of the vehicle electronic mirror system 90 will be described. FIG. 10 is a flowchart showing a behavior flow of the vehicle electronic mirror system 90. The CPU 48 reads the surrounding display program from the ROM 50 or the storage 54, expands the surrounding display program in the RAM 52, and executes the surrounding display program, so that the picture display is performed. Here, processes identical to those in the first embodiment are denoted by identical reference characters, and the descriptions are omitted.

The CPU 48 determines whether the attention object has been detected (step S200). In the case where the attention object has not been detected (step S200: NO), the CPU 48 performs the process from step S100. On the other hand, in the case where the attention object has been detected (step S200: YES), the CPU 48 displays, on the inner mirror display 18, the second picture 80 resulting from changing the compression ratio of the lateral rearward view picture 72 or lateral rearward view picture 74 of one side in the vehicle-width direction that corresponds to the direction of the detection of the attention object to a smaller compression ratio or the non-compression (step S104), and thereafter, repeats the process from step S102. Then, in the case where the system end process for the power unit system of the vehicle 12 is performed, the CPU 48 ends the process based on the surrounding display program.

Operation and Effect of Second Embodiment

Next, an operation and an effect of the second embodiment will be described.

The above configuration is the same as the configuration of the vehicle electronic mirror system 10 in the first embodiment, except that when the physical body is detected in the periphery of the vehicle 12, the compression ratio of the lateral rearward view picture 72 or lateral rearward view picture 74 of one side in the vehicle-width direction that corresponds to the direction of the detection of the physical body is changed to a smaller compression ratio or the non-compression. Therefore, the same effect as the first embodiment is obtained. Further, when the physical body is detected in the periphery of the vehicle 12, the control device 22 changes the compression ratio of the lateral rearward view picture 72 or lateral rearward view picture 74 of one side in the vehicle-width direction that corresponds to the direction of the detection of the physical body, to a smaller compression ratio than the compression ratio before the detection of the physical body, or to the non-compression. Further, the control device 22 changes the compression ratio of the lateral rearward view picture 72 or lateral rearward view picture 74 of the side corresponding to the other side in the vehicle-width direction, to a larger compression ratio than the compression ratio before the detection of the physical body. Accordingly, it is possible to grasp the situation in a wide range of the vehicle rearward side, and it is possible to easily grasp the distance sense in the lateral rearward view of the one side in the vehicle-width direction that corresponds to the direction of the detection of the physical body. That is, the occupant can easily grasp the distance sense for the physical body. Thereby, when the physical body exists in the periphery of the vehicle 12, the occupant can further appropriately grasp the situation of the periphery of the vehicle 12.

In the first and second embodiments, the rearward view picture 70 is not compressed in both of the first picture 76 and the second picture 80. However, without being limited to this, the compression ratio of the rearward view picture 70 may be also changed.

As the display means, the inner mirror display 18 is provided. However, without being limited to this, an unillustrated display provided on an instrument panel may be adopted as the display means, a head-up display device to perform projection display on the front windshield glass may be adopted as the display means, or a device other than these devices may be adopted as the display means.

The embodiments of the present disclosure have been described above. An applicable embodiment of the present disclosure is not limited to the above embodiments. Naturally, various modifications other than the above embodiment can be carried out without departing from the spirit of the present disclosure.

What is claimed is:
1. A vehicle electronic mirror system comprising:
rearward view imaging means for imaging a rearward view of a vehicle;
lateral rearward view imaging means for imaging each of rearward views of right and left lateral sides of the vehicle;
compression process control means for compressing at least one of a rearward view picture resulting from the imaging by the rearward view imaging means and right and left lateral rearward view pictures resulting from the imaging by the lateral rearward view imaging means, at least in a vehicle-width direction, and displaying the compressed picture on display means;
compression ratio change control means for changing a compression ratio of the picture in the compression process control means, from a compression ratio at a normal time, depending on at least one of a state of the vehicle and a situation of a periphery of the vehicle; and
wherein when a physical body is detected in the periphery of the vehicle, the compression ratio change control means changes the compression ratio of the lateral rearward view picture of one side in the vehicle-width direction, to a smaller compression ratio than a compression ratio before the detection of the physical body, or to non-compression, and changes the compression ratio of the lateral rearward view picture of the other side in the vehicle-width direction, to a larger compression ratio than a compression ratio before the detection of the physical body, the one side in the vehicle-width direction corresponding to a direction of the detection of the physical body.

2. The vehicle electronic mirror system according to claim 1, wherein when the compression ratio change control means changes the compression ratio of the picture to be displayed on the display means, the compression ratio change control means continuously changes the compression ratio.

3. The vehicle electronic mirror system according to claim 1, wherein the compression process control means displays a boundary mark on a boundary between the rearward view picture and the lateral rearward view picture that are displayed on the display means.

* * * * *